(12) United States Patent
Einwächter

(10) Patent No.: US 11,063,414 B2
(45) Date of Patent: Jul. 13, 2021

(54) SEALED CABLE PASSAGE

(71) Applicant: Roxtex AB, Karlskrona (SE)

(72) Inventor: Michael Einwächter, Nättraby (SE)

(73) Assignee: Roxtec AB, Karlskrona (SE)

( * ) Notice: Subject to any disclaimer, the term of this patent is extended or adjusted under 35 U.S.C. 154(b) by 92 days.

(21) Appl. No.: 16/605,947

(22) PCT Filed: Apr. 17, 2018

(86) PCT No.: PCT/EP2018/059723
§ 371 (c)(1),
(2) Date: Oct. 17, 2019

(87) PCT Pub. No.: WO2018/192901
PCT Pub. Date: Oct. 25, 2018

(65) Prior Publication Data
US 2021/0143624 A1  May 13, 2021

(30) Foreign Application Priority Data

Apr. 18, 2017 (EP) ..................... 17166787

(51) Int. Cl.
*H02G 3/22* (2006.01)
*F16L 5/10* (2006.01)
*H02G 15/013* (2006.01)

(52) U.S. Cl.
CPC .................. *H02G 3/22* (2013.01); *F16L 5/10* (2013.01); *H02G 15/013* (2013.01)

(58) Field of Classification Search
CPC ........ H02G 3/0666; H02G 3/083; H02G 3/06; H02G 3/0608; H02G 3/0616; H02G 3/22;
(Continued)

(56) References Cited

U.S. PATENT DOCUMENTS

| 4,267,401 A | * | 5/1981 | Wilkinson | ........... | H01B 17/308 |
| | | | | | 174/151 |
| 5,087,795 A | * | 2/1992 | Guginsky | ............ | H02G 3/0675 |
| | | | | | 174/541 |

(Continued)

FOREIGN PATENT DOCUMENTS

| DE | 1824049 U | 12/1960 |
| EP | 1003261 A1 | 5/2000 |

(Continued)

OTHER PUBLICATIONS

International Search Report for International Application No. PCT/EP2018/059723 dated Jul. 3, 2018 (3 pages).

*Primary Examiner* — Angel R Estrada
(74) *Attorney, Agent, or Firm* — Merchant & Gould P.C.

(57) ABSTRACT

The present invention concerns a transit for leading cables, pipes or wires through a partition in a sealed way. The transit comprises a sleeve (1) and a seal (2) to be received inside a central through opening of the sleeve (1). The seal (2) comprises a base part (7), a front fitting (9) and a rear fitting (10), which front and rear fittings (9, 10) are placed at opposite ends of the base part (7). The base part (7) of the seal (2) is made of a compressible material, whereby the front and rear fittings (9, 10) are arranged to be moved towards each other in order to compress the base part (7) of the seal (2). The compression is achieved by co-operating threaded pins (19) and nuts (11). At least one rotating fitting (13) is placed between the front fitting (9) and the base part (7) of the seal (2), and is received on one of the threaded pins (19).

11 Claims, 2 Drawing Sheets

(58) Field of Classification Search
CPC .. H02G 3/24; H02G 3/26; H02G 3/30; H02G 3/0691; H02G 15/007; H02G 15/068; H02G 15/00; H02G 15/003; H02G 15/02; H02G 15/04; H02G 15/20; H02G 15/24; H02G 15/013; H02G 15/23; H05K 9/0018; H05K 9/0015; F16L 5/10; F16L 5/00; F16L 5/02
USPC .... 174/654, 652, 74 R, 78, 84 R, 88 C, 650, 174/653, 668, 659, 660, 663, 72 A, 77 R, 174/75 R; 285/232, 231, 390, 149.1, 285/154.1, 154.3, 154.4; 248/49, 59, 68.1
See application file for complete search history.

(56) References Cited

U.S. PATENT DOCUMENTS

| | | | | |
|---|---|---|---|---|
| 7,094,968 B2* | 8/2006 | Motzigkeit | ............ | H02G 3/088 16/2.2 |
| 8,686,289 B2* | 4/2014 | Burke | .................. | H02G 15/013 174/77 R |
| 8,963,010 B2* | 2/2015 | Sprenger | .................. | H02G 3/22 174/151 |
| 10,483,734 B2* | 11/2019 | Yeh | ...................... | H02G 3/0666 |

FOREIGN PATENT DOCUMENTS

| | | |
|---|---|---|
| GB | 913727 | 12/1962 |
| GB | 2205139 A | 11/1988 |
| WO | 2010090581 A1 | 8/2010 |
| WO | 2010090586 A1 | 8/2010 |

\* cited by examiner

SEALED CABLE PASSAGE

This application is a National Stage Application of PCT/EP2018/059723, filed 17 Apr. 2018, which claims benefit of Ser. No. 17166787.6, filed 18 Apr. 2017 in Europe and which applications are incorporated herein by reference. To the extent appropriate, a claim of priority is made to each of the above disclosed applications.

TECHNICAL FIELD

The present invention concerns a transit or lead-through for leading cables, pipes or wires through a partition in a sealed way.

BACKGROUND

In many different circumstances cables, pipes or wires are to go through some kind of partition in a sealed way. One example of such a circumstance is for tanks, where a cable is to go through a wall of the tank without causing any leakage. Such a transit for a tank is often referred to as a tank boundary assembly and is shown in the present application as one example.

Even though the present invention has been developed mainly as a tank boundary assembly a person skilled in the art realises that it may be used in other areas as well. The transit of the present invention may be used for sealing of cables, as well as pipes and wires. It can be used for many types of partitions in addition to tanks, such as bulkheads of ships and walls of cabinets, technical shelters, junction boxes and machines. The transit of the present invention may be used in many different industrial environments, such as marine, offshore, automotive, telecom, power generation and distribution.

Further demands on transits or lead-throughs of this kind can be that they should allow for cable replacement, that they should be possible to retrofit, that they are easy to handle and that they can be installed from one side of a partition.

SUMMARY

One object of the present invention is to mechanically restrain a seal from moving axially in relation to a sleeve, inside of which the seal is received. The seal and the sleeve forms a transit for a cable, pipe or wire. Furthermore, inner sheets, forming a part of the seal, are to be restrained from moving axially in relation to the rest of the seal.

The above object is achieved with the features of claim 1.

According to one aspect of the present invention a transit for a cable, pipe or wire is provided, comprising a sleeve and a seal received inside the sleeve. The sleeve has a central through opening for receiving the seal. The seal comprises a compressible base part with a front fitting and a rear fitting placed at opposite ends of the central part. The front and rear fittings are arranged in such a way that they can be moved towards each other to compress the base part of the seal. The seal has at least one rotating fitting placed between a front fitting and a base part of the seal. The at least one rotating fitting is arranged rotatable on a pin.

According to another aspect of the present invention the transit is used as a tank boundary assembly.

Further objects and advantages of the invention will be obvious to a person skilled in the art when reading the detailed description below of embodiments of the present invention.

BRIEF DESCRIPTION OF THE DRAWINGS

The invention will be described further below by way of example and with reference to the enclosed drawings. In the drawings.

DETAILED DESCRIPTION OF EMBODIMENTS

Figure 1:
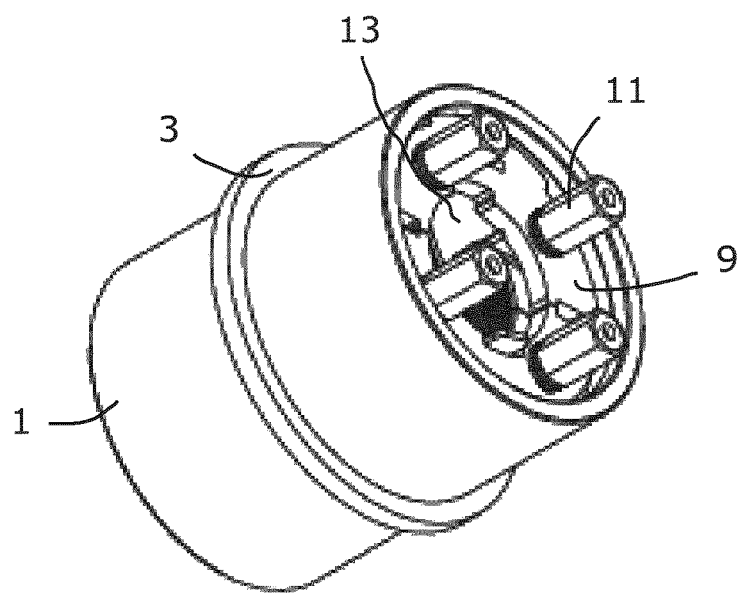
FIG. 1 is a perspective view of one example of a transit according to the present invention.
Figure 2:
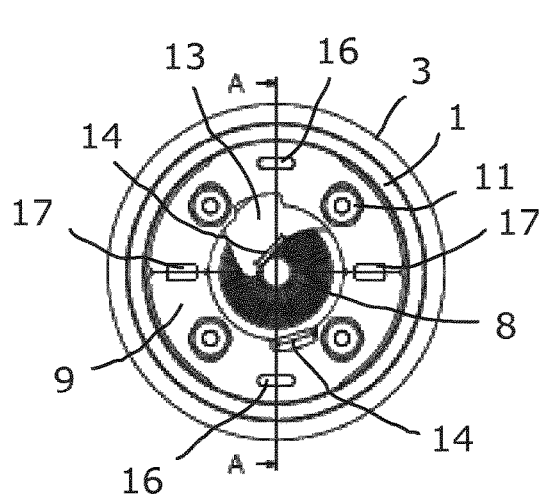
FIG. 2 is an end view of the transit of FIG. 1.
Figure 3:
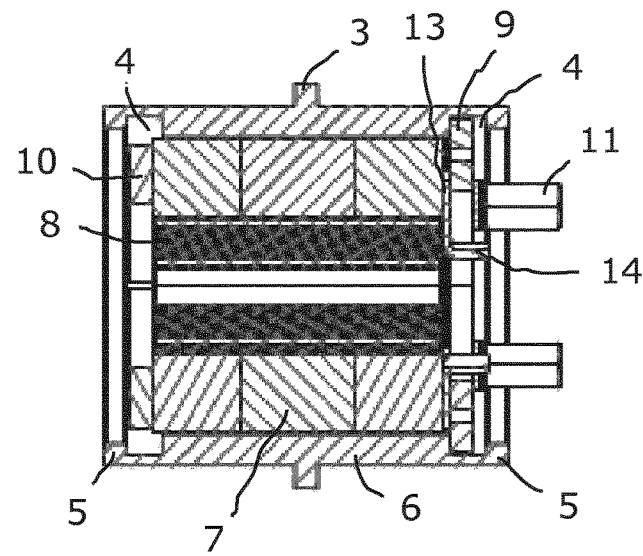
FIG. 3 is a cross section view taken along the line A-A in FIG. 2.
Figure 4:
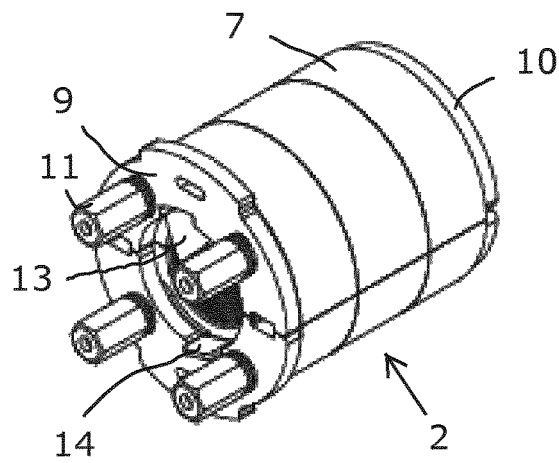
FIG. 4 is a perspective view of a seal forming a part of the transit of previous Figs.
Figure 5:
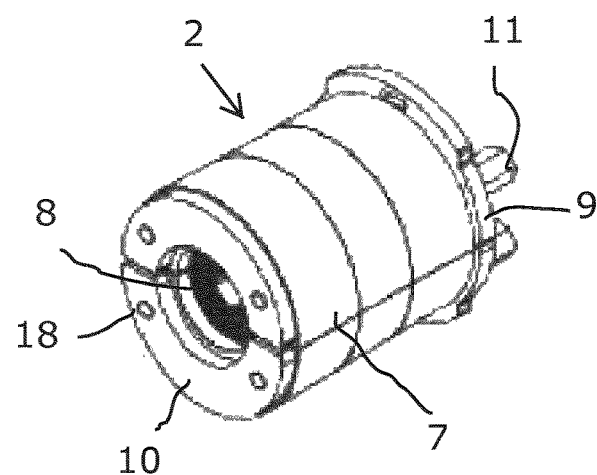
FIG. 5 is a perspective view of the seal of FIG. 4 taken in an opposite direction.
Figure 6:
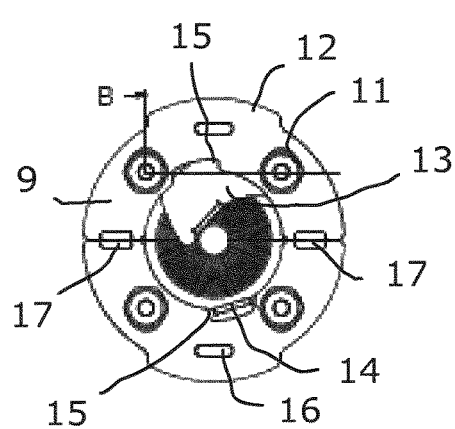
FIG. 6 is an end view of the seal of FIGS. 4 and 5.
Figure 7:
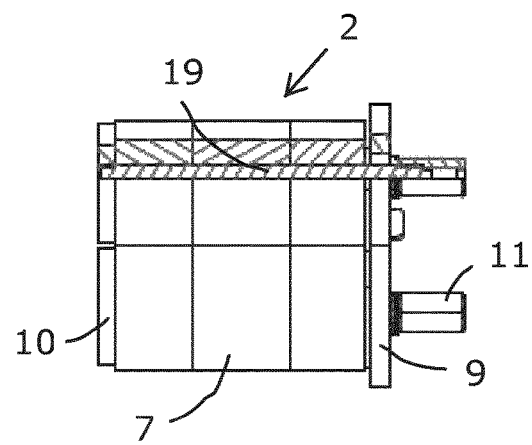
FIG. 7 is a section view along the line B of FIG. 6.

As used in this description the expressions "axial", "radial", "longitudinal" and similar expressions are in view of a cable, pipe or wire received in the centre of the transit.

The transit of the present invention comprises two main parts, a sleeve 1 and a seal 2. The seal 2 is to be received inside the sleeve 1.

The sleeve 1 has a generally cylindrical shape with a protruding circumferential flange 3 on the outside of the sleeve 1. The flange 3 is placed approximately in the middle of the sleeve 1. In other embodiments the sleeve has no outer flange. The sleeve 1 has a through opening for receiving the seal 2. On the inside of the sleeve 1 a circumferential inner groove 4 is arranged at each opposite end of the sleeve 1, between an end part 5 and a central part 6 of the sleeve 1. Thus, there is an end part 5 at each opposite end of the sleeve 1. The inner diameter of each end part 5 of the sleeve 1 is smaller than the inner diameter of each inner groove 4 of the sleeve 1 but larger than the inner diameter of the central part 6 of the sleeve 1. The inner diameter of the central part 6 of the sleeve 1 is smaller than the inner diameter of each inner groove 4 of the sleeve. In other embodiments there is an inner groove 4 only at one end of the sleeve 1.

The seal 2 has a base part 7. The base part 7 has a general cylindrical form with an inner through opening. A number of peelable sheets 8 are placed on an inner wall of the through opening of the base part 7. Both the base part 7 and the sheets 8 are made of a compressible plastic or rubber material. The seal 2 has a front fitting 9 and a rear fitting 10 at opposite ends. Both the front fitting 9 and the rear fitting 10 has a general ring form, with an inner and an outer diameter. A number of threaded pins 19 are arranged going through openings of the front fitting 9 and the base part 7. Each threaded pin 19 is fixed in an opening 18 of the rear fitting 10. The fixing of the threaded pins 19 to the openings 18 of rear fitting 10 is normally made by welding. An end of each threaded pin 19 projects outside the front fitting 9 and a nut 11 is received at each projecting end of the threaded pin 19 by means of threads. By cooperation between the threaded pins 19 and the nuts 11, the front fitting 9 and the rear fitting 10 can be moved towards each other, whereby the base part 7 is compressed in longitudinal direction. By the compression in longitudinal direction the base part 7 will expand in radial direction, both inwards and outwards. The front fitting 9 has two protruding parts 12, placed opposite each other on the outer diameter and protruding radially outwards from the front fitting 9. Two recesses 15 are placed opposite each other on the inner diameter of the front fitting

9. An oblong through opening 16 is placed at each protruding part 12 of the front fitting 9.

Two rotating fittings 13 are placed between the base part 7 and the front fitting 9 of the seal 2. Each rotating fitting 13 has an opening for receiving one of the threaded pins 19 of the seal 2. The opening for receiving the threaded pin 19 is placed at one end of the rotating fitting 13. Each rotating fitting 13 has a curved form with an axial protrusion 14 along a part of the rotating fitting 13 facing a centre of the seal 2. The axial protrusion 14 is placed at an opposite end to the end of the rotating fitting 13 having the opening for receiving the threaded pin 19. The axial protrusion 14 of each rotating fitting 13 is to be placed in one of the recesses 15 on the inner diameter of the front fitting 9 in a retracted position of the rotating fitting 13. By means of the axial protrusion 14 the rotating fitting 13 can be rotated into a desired position by hand.

In the shown embodiment the seal 2 has four threaded pins 19 received in four openings of the front fitting 9 and the base part 7, respectively. A person skilled in the art realizes that other numbers of threaded pins 19 and corresponding openings may be used. The number of threaded pins 19 often depend on the dimensions of the seal and normally varies between four and fourteen.

Normally the seal 2 is made in two parts, whereby the seal 2 is divided along a central plane. In that the seal 2 is made of two parts it can be placed around a cable or pipe already installed. Thus, each of the base part 7, the front fitting 9 and the rear fitting 10 is made in two parts. The through opening of the seal 2 is formed by means of a groove on each half of the base part 7 of the seal 2. The groove on respective half of the base part 7 of the seal goes from one end to the other end and receives the peelable sheets 8. One rotating fitting 13 is received in each half of the seal 2. Each half of the base part 7 has a central groove inside of which the peelable sheets 8 are placed. Each half of the front fitting 9 has a recess 17 at the centre of the sides to be facing the other half of the front fitting 9. The recesses 17 are placed in such a way that an oblong opening is formed where the recesses 17 of the two halves of the front fitting 9 meet.

In use the sleeve 1 is to be placed in an opening of a tank wall or other partition and the flange 3 of the sleeve 1 is to be welded to a tank wall or other partition. For sleeves not having any outer flange, the sleeve is welded directly to the tank wall or other partition.

In use the protruding parts 12 of the front fitting 9 is to be received in one of the inner grooves 4 of the sleeve 1. The outer diameter of the front fitting 9, when including the protruding parts 12 placed at opposite sides, is larger than the inner diameter of the end part 5 and central part 6, respectively, of the sleeve 1. Thus, when the front fitting 9 is received in one of the inner grooves 4 of the sleeve 1 axial movement of the front fitting 9 and, thus, the seal 2 as such, is restrained.

The outer diameter of the rear fitting 10 is smaller than the inner diameter of the end parts 5 and the central part 6, respectively, of the sleeve 1. Thus, the rear fitting 10 is free to move axially in the through opening of the sleeve 1.

Even though each half of the base part 7 of the seal 2 is made of three parts in the shown embodiment, the base part 7 of the seal 2 is normally made in one piece.

As the sleeve 1 as shown is symmetrical and has inner grooves 4 at both ends, the seal 2 can be inserted from any of the ends of the sleeve 1. For embodiments of the sleeve 1 having an inner groove 4 at only one end, the orientation of the seal 2 has to be considered when inserting it. The orientation of the seal 2 should be such that the front fitting 9 of the seal 2 is placed at the inner groove 4 of the sleeve 1 having only one inner groove.

The seal 2 of the transit of the present invention can be installed and manipulated from one side of the partition receiving the sleeve 1 of the transit.

In use the sleeve 1 is placed in an opening of some kind of a partition and is then welded to said partition, normally at the flange 3 of the sleeve 1. With the sleeve 1 in place in the partition a cable, pipe or wire is routed through the sleeve 1. The seal 2 is then to be placed around the cable, pipe or wire. In order to adapt the inner diameter of the seal 2 to the outer diameter of the cable, pipe or wire, an appropriate number of sheets 8 are peeled off from the groove of respective half of the base part 7 of the seal 2. A first half of the seal 2 is then inserted into the sleeve 1 and the cable, pipe or wire is placed in the grove of said half of the seal 2. Said first half of the seal 2 is pushed into the sleeve 1 with the end having the rear fitting 10. The nuts 11 of the inserted half of the seal 2 are not fully tightened, allowing motion for the front fitting 9 and the rotating fitting 13 but not tilting. The other, second half of the seal 2 is then inserted into the sleeve 1 and placed with the cable, pipe or wire in the grove of the second half of the seal 2. Also the second half of the seal 1 is inserted into the sleeve 1 with the end having the rear fitting 10. At insertion of the second half of the seal 2 the nuts 11 of it are loose enough to allow tilting of the front fitting 9. At insertion the protruding part 12 of the front fitting 9 will hit the end of the sleeve 1 tilting the front fitting 9. The tilted front fitting 9 is then inserted into the inner groove 4 of the sleeve 1, whereby the two parts of the front fitting 9 are in their intended position inside the inner groove 4 of the sleeve 1 locking each other. The nuts 11 of the second half of the seal 2 are then tightened to the same degree as the nuts 11 of the first half of the seal 2, allowing adjustment of the rotating fitting 13.

Before the nut 11 on the threaded pin 19 receiving each of the rotating fittings 13 is fully tightened, each rotating fitting 13 is rotated to a position where the axial protrusion 14 abuts the cable, pipe or wire received inside the seal 2. In that position each rotating fitting 13 will cover the ends of the sheets 8 of the seal 2. When the nuts 11 are tightened each rotating fitting 13 will be kept in the position where the axial protrusion 14 abuts the cable, pipe or wire by means of being pressed between the front fitting 9 and the base part 7 of the seal 2.

When the protruding parts 12 of the front fitting 9 have been placed inside the inner groove 4 of the sleeve 1, the nuts 11 are tightened. As the nuts 11 are tightened the front fitting 9 and the rear fitting 10 will be moved in direction towards each other, compressing the base part 7 of the seal 2. As the base part 7 of the seal 2 is compressed in axial direction, it will expand radially and be pressed outwardly against the inner wall of the through opening of the sleeve 1, at the same time as it is pressed inwardly against the cable, pipe or wire received inside the seal 2.

The openings 16 and the recesses 17 of the front fitting 9 are used in un-installation of the seal 2. To un-install the seal 2, the nuts 11 are first loosened. A screwdriver or other suitable tool is then inserted in at least one of the recesses 17, to tilt one half of the front fitting 9 on top of the other half of the front fitting 9. The tool can then be inserted in the opening 16 to move the tilted half of the front fitting 9 into the centre of the seal 2. One half of the seal 2 will then be free to be pulled out of the sleeve 1. It is then possible to also pull out the other half of the seal 2.

The invention claimed is:

1. A transit for a cable, pipe or wire comprising a sleeve and a seal to be received inside the sleeve, wherein the sleeve has a central through opening, wherein the seal comprises a base part, a front fitting and a rear fitting, which front fitting and rear fitting are placed at opposite ends of the base part, wherein the base part of the seal is made of a compressible material, and wherein the seal comprises means to move the front fitting and the rear fitting towards each other compressing the base part, wherein the seal comprises threaded pins fixed to the rear fitting and going through openings of the base part and the front fitting, that nuts are received on one end of each threaded pin projecting outside the front fitting, that at least one rotating fitting is placed between the front fitting and the base part of the seal, with an opening of the rotating fitting placed on one of the threaded pins, and that the at least one rotating fitting is arranged to be rotated on the threaded pin.

2. The transit of claim 1, wherein each rotating fitting has a protrusion extended in axial direction of the seal, which protrusion is placed at an end remote to the threaded pin receiving the rotating fitting and wherein the protrusion of each rotating fitting is arranged to abut against a cable received inside the seal.

3. The transit of claim 2, wherein the front fitting has one or more recesses on an inner circumference, arranged to receive the protrusion of the at least one rotating fitting.

4. The transit of claim 1, wherein the sleeve has at least one inner groove at one ned of the sleeve, which inner groove is designed to receive one or more protruding parts of the front fitting.

5. The transit of claim 4, wherein the front fitting has two protruding parts placed opposite each other.

6. The transit of claim 1, wherein the base part, the front fitting and the rear fitting of the seal each comprises two separate identical parts.

7. The transit of claim 6, wherein each half of the base part of the seal has a central groove extending from one end to the other end of the half of the base part, wherein a number of peelable sheets are placed in the central groove and wherein a through opening is formed in the seal by means of the groove of respective half of the base part of the seal.

8. The transit of claim 6, wherein each part of the front fitting has a recess on the edges facing the other part of the front fitting, whereby two openings are formed when the front fitting is fastened to the base part.

9. The transit of claim 1, wherein the sleeve has a general tubular form and a flange on an outer circumference, which flange is placed about at the centre of the sleeve.

10. The transit of any of the previous claims claim 1, wherein the base part of the seal has a general tubular form.

11. Use of the transit of claim 1 as a tank boundary assembly.

* * * * *